United States Patent
Ko et al.

(10) Patent No.: US 8,611,664 B2
(45) Date of Patent: Dec. 17, 2013

(54) METHOD FOR DETECTING FIRE-FLAME USING FUZZY FINITE AUTOMATA

(75) Inventors: ByoungChul Ko, Daegu (KR); JaeYeal Nam, Daegu (KR); SunJae Ham, Daegu (KR)

(73) Assignee: Industry Academic Cooperation Foundation Keimyung University, Daegu (KR)

( * ) Notice: Subject to any disclaimer, the term of this patent is extended or adjusted under 35 U.S.C. 154(b) by 27 days.

(21) Appl. No.: 13/296,449

(22) Filed: Nov. 15, 2011

(65) Prior Publication Data

US 2012/0148148 A1   Jun. 14, 2012

(30) Foreign Application Priority Data

Nov. 16, 2010  (KR) ........................ 10-2010-0113616

(51) Int. Cl.
 *G06K 9/00*  (2006.01)
(52) U.S. Cl.
 USPC ......................................... 382/181; 382/159
(58) Field of Classification Search
 USPC ................... 382/100, 155, 159, 161, 181, 231
 See application file for complete search history.

(56) References Cited

U.S. PATENT DOCUMENTS

2004/0086152 A1*  5/2004  Kakarala et al. .............. 382/103
2006/0209184 A1*  9/2006  Chen ............................... 348/61

\* cited by examiner

*Primary Examiner* — Edward Park
(74) *Attorney, Agent, or Firm* — Jefferson IP Law, LLP (57) ABSTRACT

A method for detecting a fire flame using fuzzy finite automata is provided. The fire-flame detection method comprises (1) acquiring an image required for the detection of fire-flame, (2) dividing the image into a number of blocks, (3) extracting a fire-flame candidate block using a brightness distortion of a pixel in the block, (4) detecting a fire-flame candidate region from the fire-flame block using a color probability model, and (5) determining whether the fire-flame candidate region corresponds to a fire-flame via fuzzy finite automata. The fire-flame detection method can detect fire-flames in a variety of fire images with relatively high precision, by establishing a probability model using the brightness distortion and wavelet energy in fire-flame regions with continuous and irregular fluctuation patterns and using the upward motion, and applying the model to fuzzy finite automata.

10 Claims, 9 Drawing Sheets

METHOD FOR DETECTING FIRE-FLAME USING FUZZY FINITE AUTOMATA

PRIORITY

This application claims the benefit under 35 U.S.C. §119(a) of a Korean patent application filed on Nov. 16, 2010 in the Korean Intellectual Property Office and assigned Serial No. 10-2010-0113616, the entire disclosure of which is hereby incorporated by reference.

BACKGROUND OF THE INVENTION

1. Field of the Invention

The present invention relates to fire flame detection technology. More particularly, the present invention relates to a fire-flame detection method that makes a model of visual features based on a probabilistic membership function and applies it to fuzzy finite automata (FFA), thereby remarkably enhancing the performance of detecting a fire flame.

2. Description of the Related Art

In recent years, various accidents have frequently occurred due to terrorism or natural disasters. This leads to the need for monitoring public places. As fire may endanger the lives of many people and cause economic damage. To prevent accidents, the development of an automatic fire-flame detection system is required.

Most conventional fire warning systems operate using physical or chemical characteristics regarding fire, such as, smoke, heat, radiation, etc., by infrared sensors, optical sensors, icon sensors, etc. Such conventional systems cannot operate until the sensors sense smoke or heat, for example. The systems cannot provide addition information such as the location where a fire occurred, the degree of spread of the fire, etc., either. Therefore, although the systems create a fire warning, the system managers must directly move to the fire site and detect whether a fire really occurred with the naked eye.

In order to resolve the problems in conventional sensor-based fire warning systems and to provide the fire detection result with a relatively high degree of reliability, systems have been developed to employ a CCD camera. For example, S. Y. Foo proposed a fuzzy logic approach that detects a fire in an air-plane dry bay and engine compartments by a set of statistical measures derived from histograms and by image subtraction from consecutive image frames. B. U. Toreyin proposed a method for verifying a fire by detecting moving regions via a background model and by measuring the variation of wavelet radio frequency count for candidate regions in temporal/spatial domain and a fire-colored model for candidate regions. C-C Ho proposed a system that detects and alarms in real-time frames and smoke using the spectral, spatial and temporal features. The statistical distribution of the spectral and spatial probability density serves as a weight in a fuzzy logic derivation system for detecting flame and smoke regions. Continuously adaptive mean shift (CAM-SHIFT) is used to provide feedback on the real-time position of flames and smoke.

T. Chen proposed a method that analyzes a fire via an RGB/HIS color model and information regarding the disorder spread of frame regions. D. Han proposed a system that detects fires and smoke in a tunnel by variations in color and movement. T. Celik proposed a method for applying the difference between Y, Cb, and Cr in YCbCr color space to a fuzzy logic.

In addition, a Support Vector Machine (SVM)-based fire detection method is also proposed; however, this requires additional computation time according to the number and dimensions of the support vectors. Although the SVM-based fire detection method has better detection performance than other fire detection methods, it is not suitable for real-time detection applications.

As such, many conventional systems have been researched and developed; however they have not detected fire flames with a sufficient level of precision because of the characteristics of fire flames, i.e., the continuous and disordered patterns.

SUMMARY OF THE INVENTION

Aspects of the present invention are to address at least the above-mentioned problems and/or disadvantages and to provide at least the advantages described below. Accordingly, an aspect of the present invention is to provide a fire-flame detection method that creates, with respect to fire-flame regions with continuous and irregular fluctuation patterns, a probability model using the upward motion and using the skewness of wavelet energy and brightness, applies the model to fuzzy finite automata (FFA), and thus precisely detects the fire-flames in a variety of fire-flame images.

In accordance with an aspect of the present invention, a method for detecting a fire flame using fuzzy finite automata (FFA) is provided. The method includes (1) acquiring an image required for the detection of fire-flame, (2) dividing the image into a number of blocks, (3) extracting a fire-flame candidate block using a brightness distortion of a pixel in the block, (4) detecting a fire-flame candidate region from the fire-flame block using color probability model, and (5) determining whether the fire-flame candidate region corresponds to a fire-flame via fuzzy finite automata.

Preferably, the extraction of a fire-flame candidate block includes (3a) calculating a brightness distortion of the pixel, and determining, when the brightness distortion is equal to or greater than a preset value, that the pixel corresponds to a moving pixel, and (3b) designating, when the block includes moving pixels equal to or greater than 50% of pixels, the block as a fire-flame candidate block.

Preferably, the brightness distortion of the pixel is calculated by the following equations a and b:

$$\alpha_Y = \frac{Y(p)\mu(p)}{\sigma_Y(p)^2} \bigg/ \frac{\mu(p)^2}{\sigma_Y(p)^2},\qquad\text{[Equation a]}$$

where p denotes a pixel, Y denotes brightness, $\mu$ denotes the average of brightness at pixel p, $\sigma_Y$ denotes a standard deviation, and $\alpha_Y$ denotes a brightness distortion parameter, and $$BD_Y = \sqrt{\frac{Y(p) - \alpha_Y\mu_Y(p)^2}{\sigma_Y(p)}},\qquad\text{[Equation b]}$$

where $\mu_Y$ denotes the average of brightness at pixel p, and $BD_Y$ denotes a brightness distortion.

Preferably, the detection of a fire-flame candidate region includes (4a) calculating a probability of the entire color channel for a pixel included in the fire-flame candidate block, via a color probability model, (4b) designating, when the probability of the entire color channel for a pixel is equal to or greater than a preset value, the pixel as a fire-flame candidate pixel, and (4c) detecting a set of fire-flame candidate pixels by repeating the designation with respect to every pixel in the fire-flame candidate block, and setting the set of fire-flame candidate pixels as a fire-flame candidate region.

Preferably, the calculation of a probability of the entire color channel includes calculating a probability of each color channel for a pixel via the following equation c, and calculating the probability of the entire color channel via the following equation d.

Preferably, the designation of the pixel as a fire-flame candidate pixel is performed via the following equation d, $$P_i = \frac{1}{\sqrt{2}} \exp\left(\frac{((I(x, y) - \mu)^2}{2\sigma_i^2}\right) \quad \text{[Equation c]}$$

$$i \in R, G, B$$

where $I_i(x,y)$ denotes a new input pixel, $\mu$ denotes the average of i color channel acquired from learning data, $\sigma_i$ denotes the variance of i color channel, and $P_i$ denotes the probability of i channel, and $$p(I(x, y)) = \prod_{i \in R, G, B} p_i(I(x, y)) \quad \text{[Equation d]}$$

$$\begin{cases} \text{if} & (I(x, y)) > \tau \text{ then Fire} \\ \text{else} & \text{NonFire} \end{cases}$$

where $p(I(x,y))$ denotes the probability of the entire color channel and T denotes a preset value for designating a fire-flame candidate pixel.

Preferably, the FFA is defined by a 6-tuple as the following equation e, $$\tilde{F} = \{Q, \Sigma, \delta, R, Z, \omega\} \quad \text{[Equation e]}$$

where: Q denotes a finite set of fire-flame states, VH, H, L, and VL, which represent fire-flame states corresponding to probabilities to be a fire-flame, Very High (VH), High (H), Low (L), and Very Low (VL), $\Sigma$ is a finite set of input symbols (events) in the FFA, {a11, ..., a14, a21, ..., a24, a31, ..., a34, a41, ..., a44}, the number of cases for all paths to move among the states, VH, H, L, and VL, $\delta$ is a fuzzy transition function, $\delta$: Q×$\Sigma$×Q->(0,1], R is a set of initial state, VH, Z is a set of output symbols (labels), Z={accept (Fire), reject (Non-Fire)}, and $\omega$: Q->Z is the output function.

Preferably, the determination as to whether the fire-flame candidate region corresponds to a fire-flame includes (5a) calculating membership values of brightness, wavelet energy, and of motion directions, with respect to fire-flame candidate regions by states of fire-flames, via fuzzy membership functions, respectively, (5b) designating the average of membership values by the states of fire-flames as a membership value over time, (5c) expressing the membership values over time, with respect to the fire-flame candidate regions, as the state vectors according to the states of the fire-flame, (5d) acquiring the state values by multiplying a state transition weight of a fuzzy transition function, expressed by the following equation f, to the state vectors, and determining the largest state value as the final state value, and (5e) outputting a state whether a fire-flame exists using the state of fire-flame corresponding to the final state value, $$t = [a_{i,j}]_{n \times n} = \begin{bmatrix} a_{11} & \cdots & a_{1n-1} & 0 \\ \vdots & \vdots & \vdots & \vdots \\ 0 & \cdots & a_{nn-1} & a_{nn} \end{bmatrix} \quad \text{[Equation f]}$$

where $a_{ij}$ denotes a state transition weight when the state of FFA transits from i to j. i denotes current state. j denotes the next state. n denotes the finite number.

Preferably, the membership value of brightness is calculated by transforming the temporal brightness into a probability density function of skewness, the membership value of wavelet energy is calculated by transforming wavelet energy into a probability density function of skewness via the following equation g, and the membership value of motion direction is calculated by transforming the upward orientation ratio of a motion into a probability density function of skewness via the following equation h, $$E_i(x,y) = |LH_i(x,y)| + |HL_i(x,y)| + |HH_i(x,y)| \quad \text{[Equation g]}$$

where $E_i(x,y)$ is wavelet energy of i-th block, and LH (Low-High), HL (High-Low), and HH (High-High) are the coefficients of the horizontal, vertical, and diagonal components, respectively, acquired from a wavelet transformed image, $$Up_i = \frac{\sum_{f=1}^{n} 1(M_f^t)}{N}, \quad \text{[Equation h]}$$

where $Up_i$ is the upward orientation ratio of a motion, N denotes frame, $M_f^t$ denotes a motion orientation in a block and is acquired by the following equation i, and 1( ) is a function that returns 1 if $M_f^t$ has a value between 2 and 4, and 0 otherwise, $$M_{code}^b = \left\lfloor \frac{a\tan(mv_y^b/mv_x^b) \times 10}{8} \right\rfloor + 1, \quad \text{[Equation i]}$$

where $M^b_{code}$ denotes the motion orientation in a block, $mv^b_x$ is a motion vector in x-direction, and $mv^b_y$ is a motion vector in y-direction.

Preferably, the membership value of the motion orientation is acquired by transforming the probability density functions of VH an VL states via the following equations j and k, $$\mu_{M-VH}(x) = \begin{cases} e^{-\frac{1}{2}\left(\frac{x-m_{VH}}{\sigma_{VH}}\right)^2} & x < \mu_{VH} \\ 1 & x \geq \mu_{VH} \end{cases} \quad \text{[Equation j]}$$

$$\mu_{M-VL}(x) = \begin{cases} e^{-\frac{1}{2}\left(\frac{x-m_{VL}}{\sigma_{VL}}\right)^2} & x > \mu_{VL} \\ 1 & x \leq \mu_{VL} \end{cases} \quad \text{[Equation k]}$$

where $m_{VH}$, $m_{VL}$, $\delta_{VH}$, and $\delta_{VL}$ are averages and variances of probability density functions in VH and VL states in the motion orientations, respectively, and $\mu_{VH}$, $\mu_{VL}$, $\mu_{M-VH}$, and $\mu_{M-VL}$ are membership functions in VH and VL states and in modified VH and VL states, in the motion orientations, respectively.

Preferably, the state vectors according to the states of the fire-flame represented by the following equation 1, and the state values are calculated by the following equation m, $$q = [m_k]_{1 \times n} = [m_1 \ldots m_n] \quad \text{[Equation l]}$$

where q is state vector, n is a state of a fire-flame, and mk is a membership value of the n-th state, $$\hat{q} = q \circ t = [m_1 \ldots m_n] \cdot \begin{bmatrix} a_{11} & \ldots & a_{1n-1} & 0 \\ \vdots & \vdots & \vdots & \vdots \\ 0 & \ldots & a_{nn-1} & a_{nn} \end{bmatrix},$$ [Equation m]

where t is expressed by the equation f.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will become more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In this application, it will be understood that when an element is referred to as being "connected" or "coupled" to another element, it can be directly connected or coupled to the other element or intervening elements may be present. It will be further understood that the terms "includes," "comprises," "including" and/or "comprising," specify the presence of stated features, integers, steps, operations, elements, and/or components, but do not preclude the presence or addition of one or more other features, integers, steps, operations, elements, components, and/or groups thereof.

Figure 1:
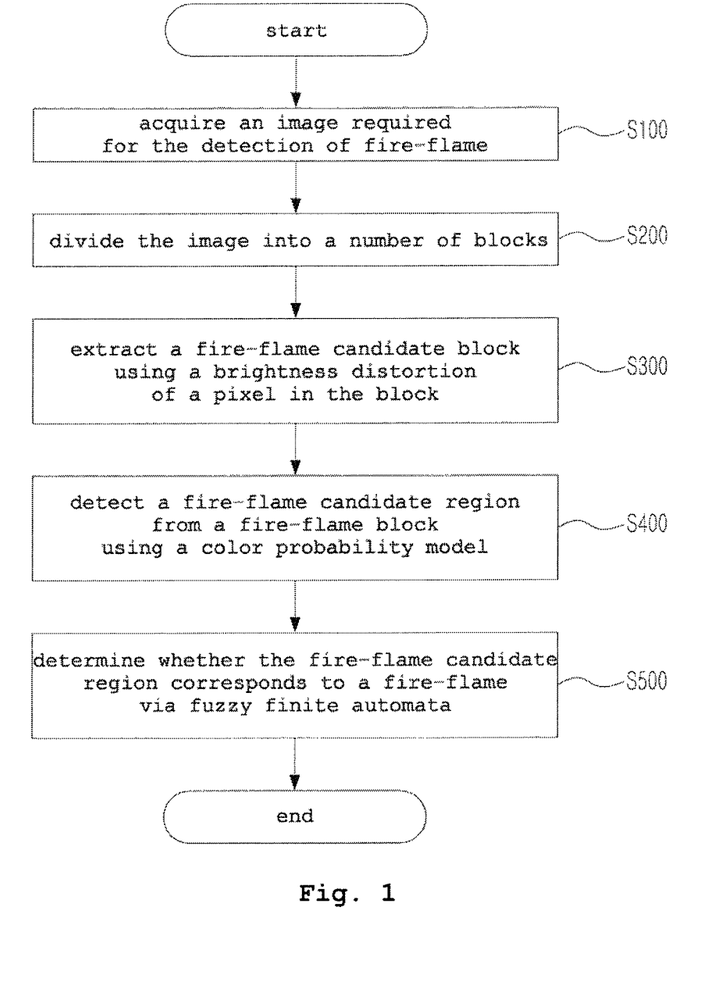
FIG. 1 illustrates a flowchart that describes a fire-flame detection method using fuzzy finite automata (FFA) according to an exemplary embodiment of the present invention.

FIG. 1 illustrates a flowchart that describes a fire-flame detection method using fuzzy finite automata (FFA) according to an exemplary embodiment of the present invention.

Referring to FIG. 1, the fire-flame detection method is achieved by performing the following processes: an acquisition of an image required for the detection of fire-flame (S100); a division of the image into a number of blocks (S200); an extraction of a fire-flame candidate block using a brightness distortion of a pixel in the block (S300); a detection of a fire-flame candidate region from the fire-flame block using a fuzzy membership function (S400); and a determination as to whether the fire-flame candidate region corresponds to a fire-flame via fuzzy finite automata (FFA)(S500).

In the acquisition of an image required for the detection of fire-flame at step S100, the images are acquired by a camera. It is preferable that the images are acquired from fixed frames so that a fire-flame can be more precisely detected.

In the division of the image into a number of blocks at step S200, the image is divided into N×N blocks. It is preferable that all operations are performed by blocks, as this makes real-time image processing possible. Real-time processing makes an immediate response possible with respect to the detection of a fire-flame.

In the extraction of a fire-flame candidate block using a brightness distortion of a pixel in the block at step S300, the brightness distortion is used to detect a moving region and to extract a fire-flame candidate block. In an embodiment of the invention, Horpraser's background modeling algorithm is employed to detect a moving region. In order to increase the process speed, only the brightness component is extracted from the image and used for the extraction, instead of the operations with respect to respective RGB channels, and the average and the variance are calculated via a current frame and the two frames immediately before the frame. The extraction of a fire-flame candidate block at step 300 is described in detail referring to FIG. 2.

Figure 2:
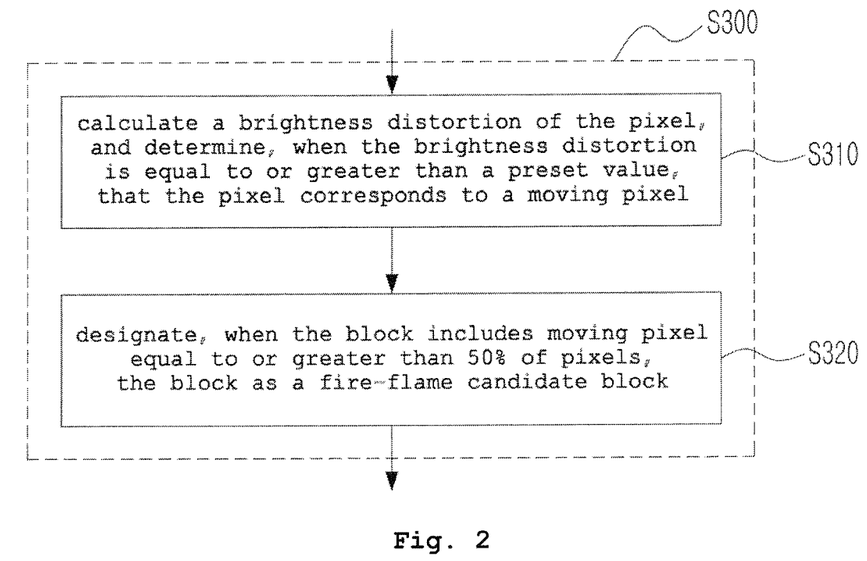
FIG. 2 illustrates a flowchart that describes step S300 in detail shown in FIG. 1 according to an exemplary embodiment of the present invention.

FIG. 2 illustrates a flowchart that describes step S300 in detail shown in FIG. 1 according to an exemplary embodiment of the present invention.

Referring to FIG. 2, in the extraction of a fire-flame candidate block at step 300, a brightness distortion of the pixel is calculated and, when the brightness distortion is equal to or greater than a preset value, the pixel is designated as a moving pixel (S310). When the block includes moving pixels equal to or greater than 50% of pixels, the block is designated as a fire-flame candidate block (S320).

At step S310, a pixel p in an image is expressed by four components, i.e., parameters, $\mu_p$, $\sigma_p$, $\alpha_p$, and $BD_p$. The parameters are expressed by the following equations 1 and 2. When a pixel has a brightness distortion equal to or greater than a preset value, it is determined as a moving pixel.

$$\alpha_Y = \frac{Y(p)\mu(p)}{\sigma_Y(p)^2} \bigg/ \frac{\mu(p)^2}{\sigma_Y(p)^2}, \quad \text{[Equation 1]}$$

where p denotes a pixel, Y denotes brightness, $\mu$ denotes the average of brightness at pixel p, $\sigma_Y$ denotes a standard deviation, and $\alpha_Y$ denotes a brightness distortion parameter.

$$BD_Y = \sqrt{\frac{Y(p) - \alpha_Y \mu_Y(p)^2}{\sigma_Y(p)}}, \quad \text{[Equation 2]}$$

where $\mu_Y$ denotes the average of brightness at pixel p, and $BD_Y$ denotes a brightness distortion.

At step S320, when the block includes moving pixels equal to or greater than 50% of pixels, the block is designated as a fire-flame candidate block. Although the embodiment is implemented in such a way as to determine whether a moving image is included in a block equal to or greater than with 50% of pixels in order to designate the block as a fire-flame candidate, it should be understood that the invention is not limited to the embodiment. For example, the percentage of pixels may be set according to the user's settings.

Referring back to FIG. 1, a fire-flame candidate region is detected from the fire-flame block using a color probability model at step S400. Fire-flame candidate regions are detected via a color model. A fire-flame candidate region is determined via a probability model established with respect to RGB channels. The detection of a fire-flame candidate region at step S400 is described in detail referring to FIG. 3.

Figure 3:
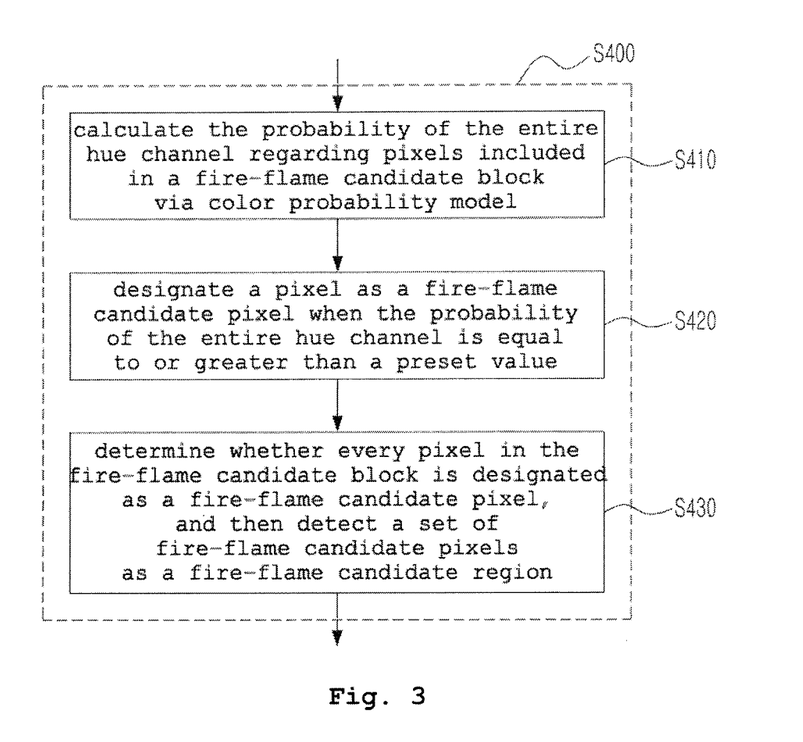
FIG. 3 illustrates a flowchart that describes step S400 in detail shown in FIG. 1 according to an exemplary embodiment of the present invention.

FIG. 3 illustrates a flowchart that describes step S400 in detail shown in FIG. 1 according to an exemplary embodiment of the present invention.

Referring to FIG. 3, a probability of the entire color channel for a pixel included in the fire-flame candidate block is calculated via a color probability model (S410). When the probability of the entire color channel for a pixel is equal to or greater than a preset value, the pixel is designated as a fire-flame candidate pixel (S420). When a set of fire-flame candidate pixels is acquired by repeating the designation of step S420 with respect to every pixel in the fire-flame candidate block, the set of fire-flame candidate pixels is detected as a fire-flame candidate region (S430).

As step S410, when assuming that the color channels, i.e., RGB channels, form independent distributions, each forming Gaussian distribution, the color probability model of every channel is expressed by the following equation 3.

$$P_i = \frac{1}{\sqrt{2}} \exp\left(\frac{((I_i(x,y) - \mu)^2}{2\sigma_i^2}\right) i \in R, G, B, \quad \text{[Equation 3]}$$

where $I_i(x, y)$ denotes a new input pixel, $\mu$ denotes the average of i color channel acquired from learning data, $\sigma_i$ denotes the variance of i color channel, and $P_i$ denotes the probability of i channel.

From the color probability model of each channel, a probability of channel i of new pixel $I_i(x, y)$ can be acquired. Using the probability of every color channel, the probability of the entire color channel can be calculated by the following equation 4.

$$p(I(x, y)) = \prod_{i \in R,G,B} p_i(I_i(x, y)) \quad \text{[Equation 4]}$$

$$\begin{cases} \text{if} & (I(x, y)) > \tau \quad \text{then Fire} \\ \text{else} & \text{NonFire,} \end{cases}$$

where $p(I(x, y))$ denotes the probability of the entire color channel and $\tau$ denotes a preset value for designating a fire-flame candidate pixel.

When the probability of the entire color channel for a pixel is equal to or greater than a preset value $\tau$, the designation of the pixel as a fire-flame candidate pixel at step S420 is performed via equation 4 described above.

Figure 4:
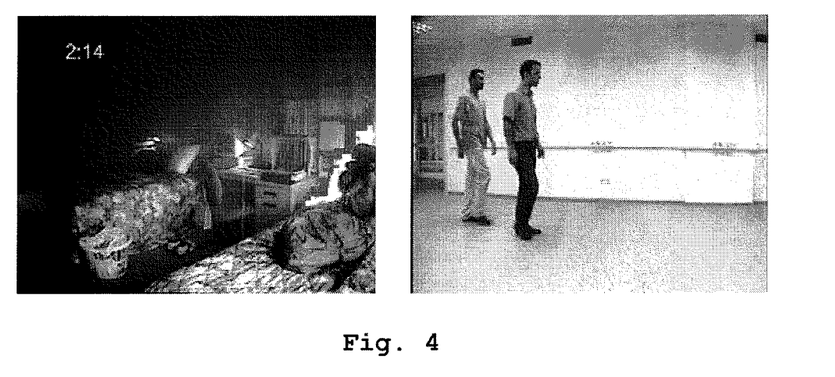
FIG. 4 illustrates candidate fire-flame blocks after initial processing according to an exemplary embodiment of the present invention.

Detecting the set of fire-flame candidate pixels as a fire-flame candidate region at step S430 is described in detail referring to FIG. 4.

FIG. 4 illustrates fire-flame candidate regions that the fire-flame detection method according to an exemplary embodiment of the present invention detects using brightness distortion and color probability model.

Referring to FIG. 4, when the fire-flame detection method detects a fire-flame candidate region, a false detection occurs in parts of blocks that have a fire-flame like color and are moving if conventional methods may determine that it is detected as a fire-flame.

Referring back to FIG. 1, the determination is made as to whether the fire-flame candidate region corresponds to a fire-flame via fuzzy finite automata (FFA) at step S500. The fire-flame candidate region is detected from a fire-flame image by applying a background model and a fire-flame color model to the fire-flame image. Most detection processes for the fire-flame candidate regions are correctly performed; however, a false detection process can still occur due to a reflection of a fire-flame or a moving object with a fire-flame like color. In order to resolve a false detection result, an additional fire-flame detection procedure is required. In an embodiment of the invention, the method employs fuzzy finite automata based on a fuzzy membership function to identify whether a fire-flame candidate region corresponds to a real fire-flame at step S500, compared with conventional heuristic methods.

Recently, fuzzy logic has become popular in a variety of fields since it is a method that can efficiently process vagueness and imprecision that are intrinsic properties in many systems. Finite automata are very useful in systems where logic designs are required. This is because finite automata serves as a theory used for computer systems and the development of languages or software related to the computer systems. Finite automata can also be used to resolve a problem via a probability approach. Therefore, fuzzy finite automata, combined the capabilities of finite automata with fuzzy logic, fits best in applications where the states continuously vary or mathematical models are difficult to define. Fuzzy finite automata have been known as an efficient method that can handle the irregularity and uncertainty in continuous space and the discontinuity in application programs.

Since the shape of fire-flame varies continuously and irregularly over time, it is difficult to set a reference to determine whether a region to be detected is a fire-flame region. Therefore, FFA is the most appropriate method that can efficiently analyze characteristics where variables are time-dependent and uncertain. The FFA employed at step S500 can be defined by a 6-tuple as the following equation 5.

$$\tilde{F} = \{Q, \Sigma, \delta, R, Z, \omega\} \quad \text{[Equation 5]}$$

where Q denotes a finite set of fire-flame states; for example, if Q is defined as four fire-flame states VH, H, L, and VL, Q={VH, H, L, VL}. VH, H, L, and VL represent fire-flame states corresponding to probabilities to be a fire-flame, Very High (VH), High (H), Low (L), and Very Low (VL). $\Sigma$ is a finite set of input symbols (events) in the FFA. Since Q is defined as four fire-flame states (VH, H, L, VL), $\Sigma$ has 16 elements, from the number of cases for all paths to move among the states, $\Sigma = \{a11, \ldots, a14, a21, \ldots, a24, a31, \ldots, a34, a41, \ldots, a44\}$. A fuzzy transition function, $\delta: Q \times \Sigma \times Q \rightarrow (0, 1]$, is used to map a current state into the next state, according to an input, in an interval of a fuzzy membership function (0, 1]. R is a set of initial state, assuming that it is VH in an embodiment of the invention. That is, the initial membership value of VH is '1.' In that case, $\mu^{t0}(VH)=1.0$ ($\mu^{t0}$ is a membership value at t0). Z is a set of output symbols (labels). In an embodiment of the invention, Z={accept (Fire), reject (Non-Fire)} has two output symbols. When the final state of FFZ is VH or H, Z has the output symbol, accept (Fire), and thus a corresponding region is determined as a fire-flame region. On the contrary, when the final state of FFZ is VL or L, Z has the output symbol, reject (Non-Fire), and thus a corresponding region is determined as a non-fire-flame region. $\omega: Q \rightarrow Z$ is the output function that defines the relationship between the input and output and acquires an output with respect to an input.

Figure 5:
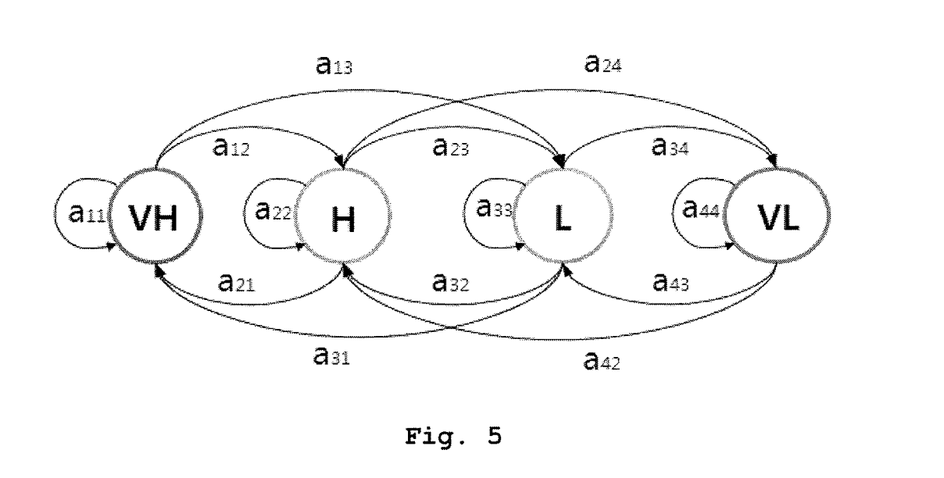
FIG. 5 illustrates a state diagram where a transition is shown, implementing fuzzy finite automata for the fire-flame detection method according to an exemplary embodiment of the present invention.

FIG. 5 illustrates a state diagram where a transition is shown, implementing fuzzy finite automata for the fire-flame detection method according to an exemplary embodiment of the present invention.

Referring to FIG. 5, Q representing a set of states of fuzzy finite automata F is expressed by circles. E representing a set of transition events from a current state to the next state is labeled with an arrow with a state transition weight. In an embodiment of the invention, it is designed in such a way that the state transition can be allowed for only up to two steps, e.g., the next state and the second next state. Therefore, VH state can be transited to H or L state in one process, but cannot be transited to VL state. This is because the state of a fire-flame is not abruptly transited from the VH state to the VL state, but instead varies step by step. The opposite situation, i.e., from VL to VH, also follows the same rule.

Figure 6:
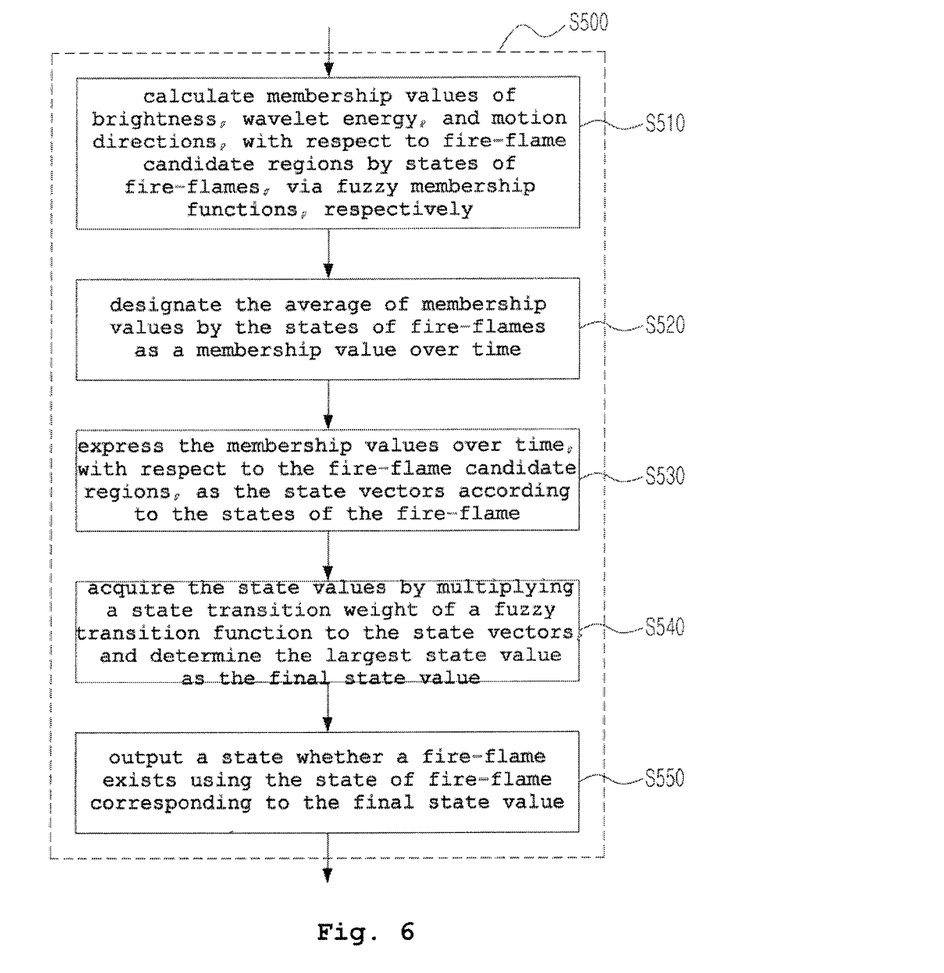
FIG. 6 illustrates a flowchart that describes step S500 in detail shown in FIG. 1 according to an exemplary embodiment of the present invention.
Figure 7:
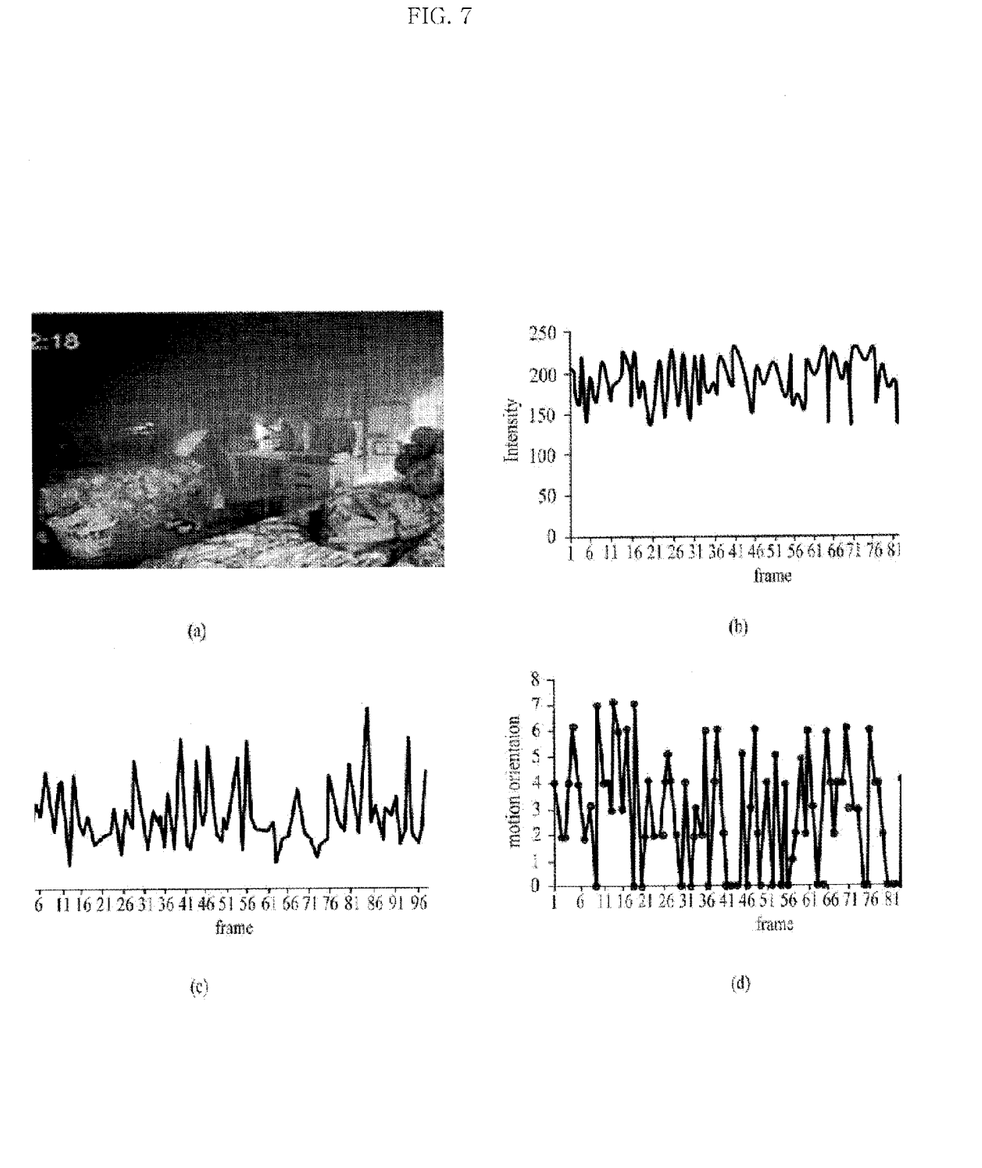
FIGS. 7A to 7D illustrate an image and graphs for the analysis of the characteristic of a fire-flame region by the fire-flame detection method using fuzzy finite automata, according to an exemplary embodiment of the present invention.
Figure 8:
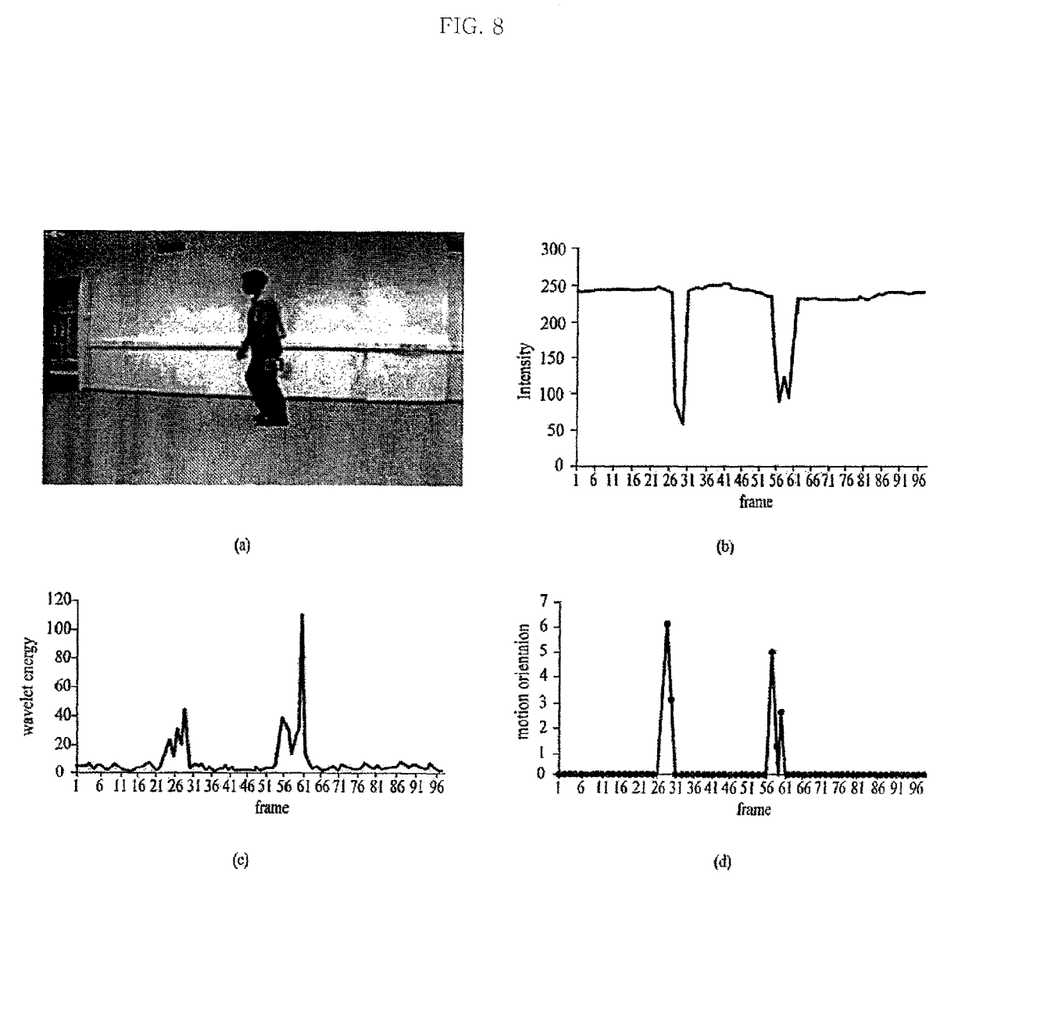
FIGS. 8A to 8D illustrate an image and graphs for the analysis of the characteristic of a non-fire-flame region by the fire-flame detection method using fuzzy finite automata, according to an exemplary embodiment of the present invention.

FIG. 6 illustrates a flowchart that describes step S500 in detail shown in FIG. 1 according to an exemplary embodiment of the present invention.

Referring to FIG. 6, the determination whether the fire-flame candidate region corresponds to a fire-flame via fuzzy finite automata at step S500 is achieved by the following processes: calculating membership values of brightness, wavelet energy, and motion orientations, with respect to fire-flame candidate regions by states of fire-flames, via fuzzy membership functions, respectively (S510); designating the average of membership values by the states of fire-flames as a membership value over time (S520); expressing the membership values over time, with respect to the fire-flame candidate regions, as the state vectors according to the states of the fire-flame (S530); acquiring the state values by multiplying a state transition weight of a fuzzy transition function to the state vectors, and determining the largest state value as the final state value (S540); and outputting a state whether a fire-flame exists using the state of fire-flame corresponding to the final state value.

At step S510, the membership values of brightness, wavelet energy, and motion orientations, with respect to fire-flame candidate regions by states of fire-flames, are calculated via fuzzy membership functions, respectively. Step S510 is described in detail referring to FIGS. 7 to 9.

Figure 9:
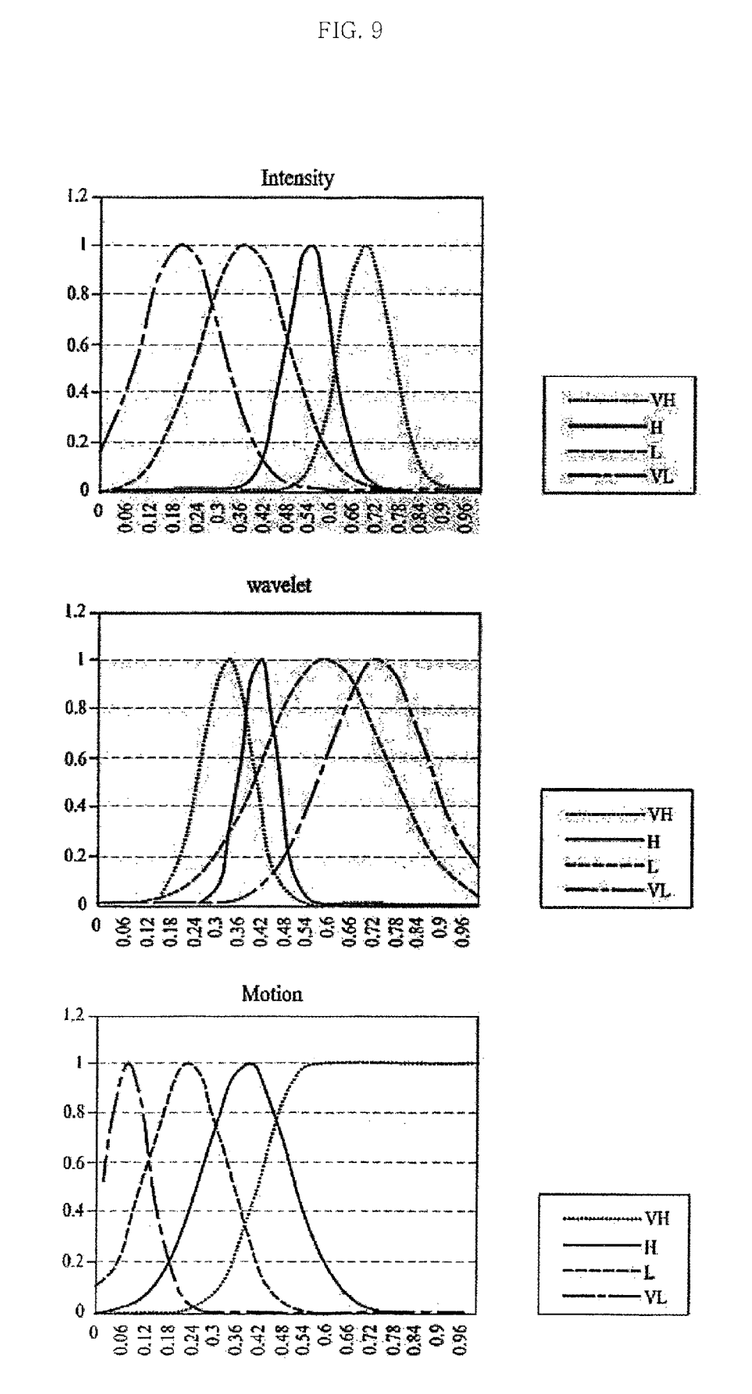
FIG. 9 illustrates fuzzy membership functions employed by the fire-flame detection method using fuzzy finite automata according to an exemplary embodiment of the present invention.

FIGS. 7A to 7D illustrate an image and graphs for the analysis of the characteristic of a fire-flame region by the fire-flame detection method using fuzzy finite automata, according to an exemplary embodiment of the present invention. FIGS. 8A to 8D illustrate an image and graphs for the analysis of the characteristic of a non-fire-flame region by the fire-flame detection method using fuzzy finite automata, according to an exemplary embodiment of the present invention. FIG. 9 illustrate fuzzy membership functions employed by the fire-flame detection method using fuzzy finite automata according to an exemplary embodiment of the present invention.

Referring to FIG. 7A, the image shows a fire-flame region from which the amount of change in the characteristics will be extracted. FIG. 7B is a graph of brightness to frame. FIG. 7C is a graph of wavelet energy to frame. FIG. 7D is a graph of motion information to frame when motion 2~4 has upward motion.

FIG. 8A shows a non-fire-flame region from which the amount of change in the characteristics will be extracted. FIG. 8B is a graph of brightness to frame. FIG. 8C is a graph of wavelet energy to frame. FIG. 8D is a graph of motion information to frame when motion 2~4 has upward motion.

General features of fire-flame regions derived via conventional fire-flame detection methods are as follows:

i) fire-flame regions have a higher brightness and higher frequency components than background;

ii) fire-flames have a variety of ranges of colors;

iii) fire-flame regions have continuously and irregularly varying patterns in the time domain; and iv) fire-flame regions have upward motion if the fire-flames are not greatly affected by an external influence such as wind.

In order to create membership functions applied to fuzzy finite automata in consideration of the features of fire-flame regions described above, the skewness and the ratio of upward motion are used that can effectively measure the variation of the wavelet energy and the brightness. Membership functions may be implemented as a variety of shapes and method depending on the applications. In an exemplary embodiment of the invention, Gaussian function is employed to establish a model for three features of a fire-flame.

At step S510, the temporal variation of each block is measured in consecutive frames with respect to the variation of brightness. Brightness varies continuously and irregularly in the fire-flame regions as shown in FIG. 7B. On the other hand, the variation of brightness occurs a few times in a limited part in a general region where an object, not a fire-flame, is moving, as shown in FIG. 8B. In order to extract the variation of brightness, blocks of 100 frames for a fire-flame image and a non-fire flame image are stored in a queue, and the skewness is measured via the following equation 6. The estimated skewness is expressed as a probability density function using Gaussian function. FIG. 9 shows a fuzzy membership function of brightness that is acquired by transforming the probability density functions of a fire-flame and non-fire flame into the states to be applied to fuzzy finite automata, e.g., VeryHigh (VH), High (H), Low (L) and Very Low (VL).

$$S(x) = \frac{n}{(n-1)(n-2)} \sum_{i=1}^{n} \left( \frac{x_i - \bar{x}}{\sigma} \right)^3 \quad \text{[Equation 6]}$$

Equation 6 is the Pearsonian coefficient of skewness, where S(x) is coefficient of skewness, n is the number of data, $x_i$ is the i-th data, and $\bar{x}$ is a median, and $\delta$ is a standard deviation.

The wavelet energy (Ei) can be acquired via the following Equation 7. Daubechies Wavelet Transform and three frequency components, LH, HL, and HH, are used to extract wavelet energy from a fire-flame candidate region.

$$E_i(x,y) = |LH_i(x,y)| + |HL_i(x,y)| + |HH_i(x,y)| \quad \text{[Equation 7]}$$

where $E_i(x, y)$ is wavelet energy of i-th block. LH (Low-High), HL (High-Low), and HH (High-High) are the coefficients of the horizontal, vertical, and diagonal components, respectively, acquired from a wavelet transformed image.

Referring to FIGS. 7C and 8C, it will be noted that wavelet energy varies continuously in the fire-flame region; however it does not in a non-fire-flame region. Therefore, the fuzzy membership function of the wavelet energy can also be modeled via the probability density function of skewness. FIG. 9 shows the wavelet energy with respect to VH, H, L, and VL states.

Since heated air rises upward, the motion vector of a flame also tends to rise. In order to extract this feature of a fire-flame, motion vectors are measured from 100 frames of a current frame and the previous frames. First, a motion vector is extracted from a block via 3-step search algorithm, and then the orientation of the motion in the block is normalized in 8 orientations via the following equation 8.

$$M_{code}^b = \left\lfloor \frac{\operatorname{atan}(mv_y^b / mv_x^b) \times 10}{8} \right\rfloor + 1, \quad \text{[Equation 8]}$$

where $M_{code}^b$ denotes the motion orientation in a block, $mv_x^b$ is a motion vector in x-direction, and $mv_y^b$ is a motion vector in y-direction.

Referring to FIGS. 7D and 8D, it will be noted that the number of values in the upward orientation is larger in the fire-flame region than in the non-fire flame region. The upward orientation ratio $Up_i$ of the i-th block in the upward motion during the preceding N (100) frames can be acquired via the following equation 10.

$$Up_i = \frac{\sum_{i=1}^{n} 1(M_f^t)}{N}, \quad \text{[Equation 9]}$$

where $Up_i$ is the upward orientation ratio of a motion, and N denotes frame. $M_f^t$ denotes a motion orientation in a block and is acquired via the equation 8. 1( ) is a function that returns 1 if $M_f^t$ has a value between 2 and 4, and 0 otherwise.

FIG. 9 shows the probability density functions of a fire-flame and a non-fire flame with respect to VH, H, L, and VL states. Unlike the other membership functions, the graphs of a motion membership function, VH and VL, show characteristics that the higher the upward orientation ratio the higher the probability of a fire, and the lower the upward orientation ration the higher the probability of a non-fire. The probability density functions shown in FIG. 9 are expressed by the following equations 10 and 11.

$$\mu_{M\text{-}VH}(x) = \begin{cases} e^{-\frac{1}{2}\left(\frac{x-m_{VH}}{\sigma_{VH}}\right)^2} & x < \mu_{VH} \\ 1 & x \geq \mu_{VH}, \end{cases} \quad \text{[Equation 10]}$$

$$\mu_{M\text{-}VL}(x) = \begin{cases} e^{-\frac{1}{2}\left(\frac{x-m_{VL}}{\sigma_{VL}}\right)^2} & x > \mu_{VL} \\ 1 & x \leq \mu_{VL}, \end{cases} \quad \text{[Equation 11]}$$

where $m_{VH}$, $m_{VL}$, $\delta_{VH}$, and $\delta_{VL}$ are averages and variances of probability density functions in VH and VL states in the motion orientations, respectively. $\mu_{VH}$, $\mu_{VL}$, $\mu_{M\text{-}VH}$, and $\mu_{M\text{-}VL}$ are membership functions in VH and VL states and in modified VH and VL states, in the motion orientations, respectively.

At step S520, the average of membership values by the states of fire-flames is designated as a membership value over time. Since the fire-flame detection method according to the invention employs three features to detect a fire-flame, i.e., brightness, wavelet energy, and motion orientation, the membership value of each state at time t is estimated via fuzzy membership function, shown in FIG. 9 and expressed by the following equation 12.

$$m_k = \operatorname{Mean}(\mu_{i-k}, \mu_{\omega-k}, \mu_{m-k}) = \frac{\mu_{i-k} + \mu_{\omega-k} + \mu_{m-k}}{3}, \quad \text{[Equation 12]}$$

where $\mu_{i-k}$, $\mu_{w-k}$, and $\mu_{m-k}$ are membership values estimated from three fuzzy membership functions with inputs $a_{i-k}$, $a_{w-k}$, and $a_{m-k}$, representing a brightness of a corresponding block, a skewness of wavelet energy, and upward orientation of a motion, at t time.

At step S530, the membership values over time, with respect to the fire-flame candidate regions, are expressed as the state vectors according to the states of the fire-flame. Conventional automata define states via '1' or '0' and express the states individually. Therefore, conventional automata express a number of states via matrixes respectively. On the contrary, the fuzzy finite automata determine statistically state membership values via fuzzy membership functions, the states can be expressed via the state vector q as the following equation 13.

$$q = [m_k]_{1 \times n} = [m_1 \ldots m_n] \quad \text{[Equation 13]}$$

where q is a state vector, n is a state of a fire-flame, and $m_k$ is a membership value of the n-th state.

For example, when a state of a fire-flame has simultaneously probabilities of 0.6 to be state VH (Very High), of 0.4 to be state H (High), of 0.2 to be state L (Low), and of 0 to be state VL (Very Low), the membership values can be expressed by the vector q=[0.6, 0.4, 0.2, 0].

At step S540, the state value is acquired by multiplying a state transition weight of a fuzzy transition function to the state vectors, and then the largest state value is determined as the final state value. In order to estimate, when a transition event occurs, a membership value of the next state, the fuzzy finite automata of the invention employs simultaneously a membership value of current states $\mu^t(q_i)$ and state transition weights described above. In addition, since the fuzzy finite automata of the invention analyze a number of features in the system and create an analysis, they also employ various types of input to determine membership values of states. For example, the fuzzy finite automata may use a number of fuzzy membership functions, and combine them to a single membership value in order to determine the state membership values $\mu^{t+1}(q_i)$ at time t+1. To this end, the arithmetic mean multi-membership resolution is used as the following equation 14.

$$\mu^{t+1}(q_m) = \left[\sum_{t=1}^{n} F(\mu^t(q_i), \delta(q_i, \alpha_k, q_j))\right] / n, \quad \text{[Equation 14]}$$

where n is the number of fuzzy membership functions, i.e., the number of inputs. State transition weights $\delta(q_i, q_k, q_j)$ from previous state $q_i$ to the next state $q_j$ upon inputs $q_k$, together with the membership value of the previous state, is applied to a membership assignment function F in order to determine a new membership value. The membership assignment function F satisfies the following three axioms $0 \leq F(\mu, \delta) \leq 1$, $F(0,0)=1$ and $F(1,1)=1$. In an exemplary embodiment of the invention, the membership assignment function F can be defined by the product operation expressed by the following equation 15.

$$F(\mu, \delta) = \text{Prod}(\mu, \Gamma) = \mu \cdot \delta \quad \text{[Equation 15]}$$

When an event occurs to the current state vector q, the next state vector $\tilde{q}$ is determined by the following equation 16, acquired by arranging the equation 13.

$$\tilde{q} = q \circ t = [m_1 \ \ldots \ m_n] \cdot \begin{bmatrix} a_{11} & \ldots & a_{1n-1} & 0 \\ \vdots & \vdots & \vdots & \vdots \\ 0 & \ldots & a_{nn-1} & a_{nn} \end{bmatrix}, \quad \text{[Equation 16]}$$

where q is a membership value of a previous state; t is a preset state transition weight and can be expressed by the following equation 17. When the next state vector $\tilde{q}$ is calculated by the product of the two values, the final state of fuzzy finite automata is determined via the max operation expressed by the following equation 19.

$$t = [a_{i,j}]_{n \times n} = \begin{bmatrix} a_{11} & \ldots & a_{1n-1} & 0 \\ \vdots & \vdots & \vdots & \vdots \\ 0 & \ldots & a_{nn-1} & a_{nn} \end{bmatrix}, \quad \text{[Equation 17]}$$

where $a_{ij}$ is a state transition weight to be applied the system when the state of fuzzy finite automata transits from i to j, where i is a current state and j is the next state. n is a finite number. For example, a12=0.3 means that, when the system transits from a current state 1 to the next state 2, the state transition weight applied to be the system is 0.3. Unlike discrete event systems where events are individually determined, the fuzzy finite automata of the invention allow the system to have a number of events each having different weights, which affect each other.

$$f_q = \text{Max}[\tilde{q}_1 \ldots \tilde{q}_n] \quad \text{[Equation 18]}$$

One from among n states that has the max value is the final state. For example, when state vector $[(\tilde{q}_1, \tilde{q}_2, \tilde{q}_3, \tilde{q}_4)]=[0.3, 0.5, 0.2, 0.1]$, $\tilde{q}_2$ is the final state since it has the max value 0.5.

In classical deterministic finite automata, the final result is uniquely determined by a current state. When the system is terminated and a case occurs where the current state is identical to the final state previously designated, the output is accepted; however, if the other cases when the system is terminated, any outputs are not explicit. On the contrary, in Moore machine, the output label is either acceptance or rejection regarding all states. Therefore, in an exemplary embodiment of the invention, a finite set of output symbols Z for the outputs is defined as Z={accept(Fire), reject(Non-Fire)} that only has two output symbols (labels). The set of final states $Q_{fin}=\{VH, H\}$ (($Qf_{in} \in Q$) is defined to have two states, VH (Very High) and H (High). The final decision of the fire-flame detection system is made according to the following equation 19. When the final state ($f_q$) is a component of $Qf_{in}$, the system determines it as a fire-flame or, otherwise, as a non-fire.

$$\omega(q_i) = \text{accept(Fire)} \Rightarrow f_q \in Q_{fin}$$

$$\omega(q_i) = \text{reject(Non-Fire)} \Rightarrow f_q \notin Q_{fin} \quad \text{[Equation 19]}$$

Figure 10:
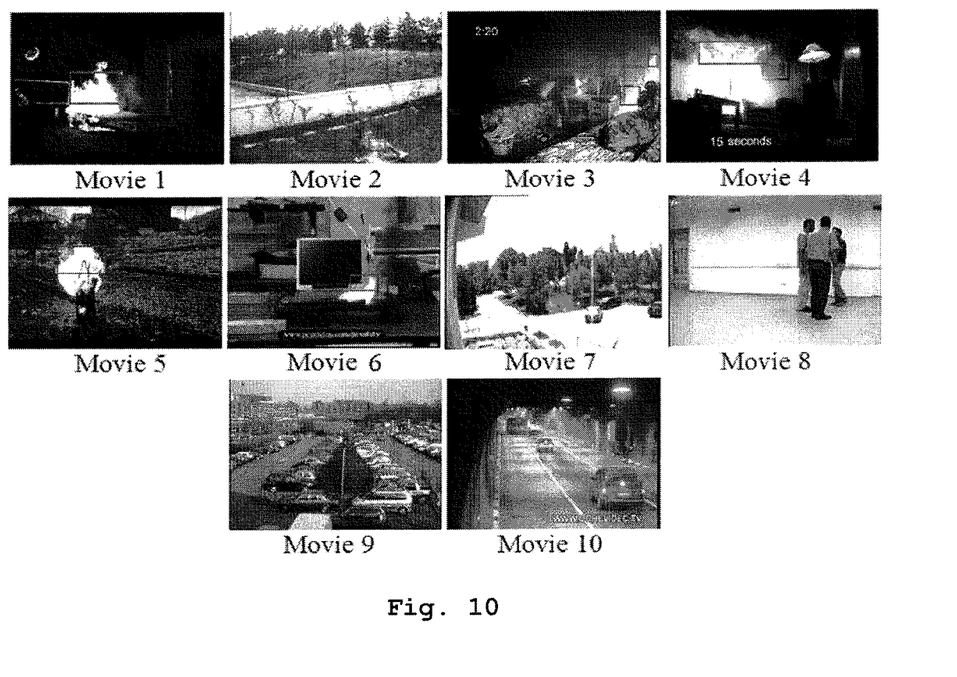
FIG. 10 illustrates images used in the experiment for the fire-flame detection method using fuzzy finite automata according to an exemplary embodiment of the present invention.

FIG. 10 illustrates images used in the experiment for the fire-flame detection method using fuzzy finite automata according to an exemplary embodiment of the present invention.

Referring to FIG. 10, in order to create membership function, the fire-flame detection method employs 12 learning images, where 6 including a fire-flame are acquired from FASTData (http://fire.nist.gov/fastdata/) and the rest of 6 including a moving object in fire-like color are acquired from CAVIAR (http://homepages.infied.ac.uk/rbf/CAVIAR/). In an exemplary embodiment of the invention, in order to extract values for creating a Gaussian probability density function, 1056 blocks in 5×5 size are selected from the 12 learning images. In FIG. 10, the portion highlighted by red line shows the detection result of a fire-flame.

The following table 1 describes information regarding the images shown in FIG. 10. Movies 1, 3, 4, and 6 are indoor fire-flame videos, and movies 2 and 5 are outdoor fire-flame videos. In order to estimate the ability for distinguishing between an object of a real fire-flame and a moving object with fire-flame like color, the fire-flame detection method employs movies 7, 8, 9 and 10 including moving fire-flame like colored objects.

TABLE 1

| Video Sequence | Number of frames | Description |
|---|---|---|
| Movie 1 | 329 | Foam mattress (indoor) |
| Movie 2 | 750 | Fire in garden (outdoor) |
| Movie 3 | 892 | Burning bed (indoor) |
| Movie 4 | 402 | Burning Christmas tree (indoor) |
| Movie 5 | 645 | Fire in field (outdoor) |
| Movie 6 | 549 | Laptop battery fire (indoor) |
| Movie 7 | 314 | Three men walking outside (outdoor) |
| Movie 8 | 209 | Three men walking in hallway (indoor) |
| Movie 9 | 304 | Fire-colored moving cars (outdoor) |
| Movie 10 | 182 | Accident in tunnel (indoor) |

Figure 11:
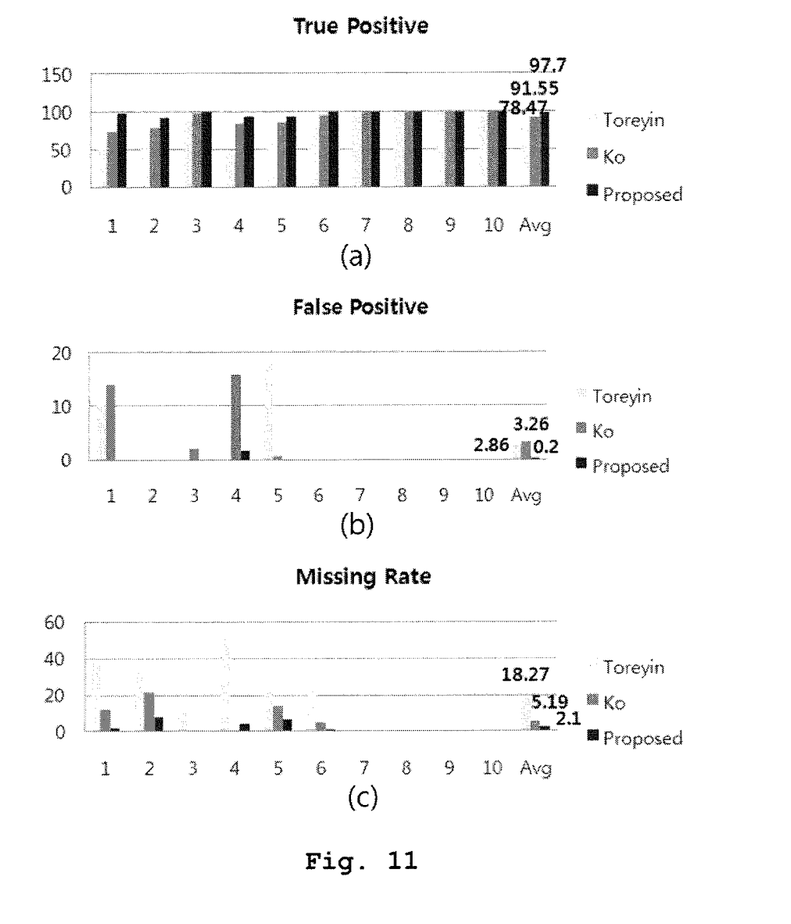
FIGS. 11A to 11C illustrate graphs showing the detection results of the fire-flame detection method using fuzzy finite automata according to an exemplary embodiment of the present invention.

FIGS. 11A to 11C illustrate graphs showing the experiment results of the fire-flame detection method using fuzzy finite automata according to an exemplary embodiment of the present invention. The results shows conventional Toreyin and Ko's fire-flame methods, and the fire-flame detection method of the invention, which are measured by the true positive (TP), the false positive (FP) and missing (M), shown in FIGS. 11A to 11C, respectively. As shown in FIGS. 11A to 11C, the fire-flame detection method of the invention outperformed Toreyin and Ko's methods with an average true positive (ATP) of 97.7% compared to 91.55% and 78.47%, average false positive (AFP) of 0.2% compared to 3.26% and 2.86%, and average missing (AM) of 2.1% compared to 5.19% and 18.27%, respectively.

The experiment results are described in detail based on the features of fire-flame images.

Movie 1 shows general fire-flame features, such as a high level of brightness, a very high level of activity, and a distinctive upward orientation. On the contrary, movie 1 also includes reflection regions by the diffusion of fire-flame in the peripheral areas, such as the floor or wall. Since Toreyin's algorithm, detecting a fire-flame via only the color or wavelet energy, and Ko's algorithm, performing a detection of fire-flame via a brightness map and Support Vector Machine (SVM), are sensitive to brightness, they make a false detection in bright regions in movie 1, created by the reflection of a fire-flame. Therefore, they are high in the false detection rate.

Movie 2 shows a fire-flame that is small and has a smaller amount of change in the brightness than the other movies. The fire-flame in movie 2 also has a color value similar to in the periphery areas, and a lower upward orientation because it moves both sides by wind. Since movie 2 has a relatively small amount of change in the brightness and a relatively lower upward orientation, the fire-flame detection method of the invention shows a higher missing detection rate in movie 2 than in the other movies.

Movie 3 shows general fire-flame features like movie 1, so Toreyin's and Ko's algorithms and the fire-flame detection method of the invention all have a high true detection rate.

Movie 4 shows that no fire-flame appears in initial 50 frames and then a fire-flame gradually spreads. Toreyin's algorithm has a higher missing detection rate. Since the fire-flame is spreading and reflects the light on the periphery wall, Ko's algorithm has a higher false detection rate. The fire-flame detection method of the invention has the highest false detection rate. This is because, when a fire flame spreads from the bottom to the top when it is created, light reflected from the wall is also getting brighter from the bottom to the top on the wall. That is, light reflected from the wall during the spread of a fire-flame causes a high level of brightness and a high upward orientation in movie 4.

Movie 5 shows an outdoor fire-flame that moves both sides by wind. Like movie 2, the fire-flame detection method of the invention shows a higher missing detection rate.

Movie 6 shows general fire-flame features and no reflection light in the periphery areas like movies 1 and 3. Toreyin's and Ko's algorithms and the fire-flame detection method of the invention all have high performance results.

Consequently, the main reason for the higher FP with Toreyin's and Ko's methods than with the fire-flame detection method of the invention is that these movies include light reflecting on the ground or wall from the flames. The fire-flame detection method of the invention reduces the false detection rate, using the probabilistic membership functions that are created via the feature variations during the preceding 100 frames and applied to FFA to verify real flames. Regarding movies 7, 8, 9, and 10, Toreyin's and Ko's methods and the fire-flame detection method of the invention did not detect moving objects as flames, they have the true detection rate of 100%, but 0% in the false detection rate and the missing detection rate respectively. Therefore, the fire-flame detection method of the invention can create a model for uncertain and vague information regarding fire-flames based on a probabilistic approach, and precisely and rapidly detect fire-flames using the probability model.

As described above, the fire-flame detection method according to the invention can detect fire-flames in a variety of fire images with relatively high precision, by establishing a probability model using the brightness distortion and wavelet energy in fire-flame regions with continuous and irregular fluctuation patterns and using the upward motion, and applying the model to fuzzy finite automata.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for detecting a fire flame using fuzzy finite automata, the method comprising:
   (1) acquiring an image required for the detection of fire-flame;
   (2) dividing the image into a number of blocks;
   (3) extracting a fire-flame candidate block using a brightness distortion of a pixel in the block;
   (4) detecting a fire-flame candidate region from the fire-flame block using a color probability model; and
   (5) determining whether the fire-flame candidate region corresponds to a fire-flame via fuzzy finite automata (FFA),
   wherein the color probability model uses an upward motion and skewness of wavelet energy and brightness, and
   wherein the FFA comprise a plurality of discrete states comprising:
      at least one state corresponding to a determination of fire; and
      at least one state corresponding to a determination of non-fire.

2. The method of claim 1, wherein the extraction of the fire-flame candidate block comprises:
   (3a) calculating the brightness distortion of the pixel, and determining, when the brightness distortion is equal to or greater than a preset value, that the pixel corresponds to a moving pixel; and
   (3b) designating, when the block includes moving pixels equal to or greater than 50% of pixels, the block as the fire-flame candidate block.

3. The method of claim 2, wherein the brightness distortion of the pixel is calculated by the following equations a and b:

$$\alpha_Y = \frac{Y(p)\mu(p)}{\sigma_Y(p)^2} \Big/ \frac{\mu(p)^2}{\sigma_Y(p)^2}, \quad \text{[Equation a]}$$

where p denotes a pixel, Y denotes brightness, $\mu$ denotes the average of brightness at pixel p, $\sigma_Y$ denotes a standard deviation, and $\alpha_Y$ denotes a brightness distortion parameter; and $$BD_Y = \sqrt{\frac{Y(p) - \alpha_Y \mu_Y(p)^2}{\sigma_Y(p)}},$$ [Equation b]

where $\mu_Y$ denotes the average of brightness at pixel p, and $BD_Y$ denotes a brightness distortion.

4. The method of claim 1, wherein the detection of the fire-flame candidate region comprises:
(4a) calculating a probability of the entire color channel for a pixel included in the fire-flame candidate block, via the color probability model;
(4b) designating, when the probability of the entire color channel for the pixel is equal to or greater than a preset value, the pixel as a fire-flame candidate pixel; and
(4c) detecting a set of fire-flame candidate pixels by repeating the designation with respect to every pixel in the fire-flame candidate block, and setting the set of fire-flame candidate pixels as the fire-flame candidate region.

5. The method of claim 4, wherein:
the calculation of a probability of the entire color channel comprises:
calculating a probability of each color channel for a pixel via the following equation c; and
calculating the probability of the entire color channel via the following equation d, and
the designation of the pixel as a fire-flame candidate pixel is performed via the following equation d, $$P_i = \frac{1}{\sqrt{2}} \exp\left(\frac{((I_i(x,y) - \mu)^2}{2\sigma_i^2}\right) \quad i \in R, G, B,$$ [Equation c]

where $I_i(x, y)$ denotes a new input pixel, $\mu$ denotes the average of i color channel acquired from learning data, $\sigma_i$ denotes the variance of i color channel, and $P_i$ denotes the probability of i channel; and $$p(I(x,y)) = \prod_{i \in R,G,B} p_i(I(x,y))$$ [Equation d]

$$\begin{cases} \text{if} & (I(x,y)) > \tau \text{ then Fire} \\ \text{else} & \text{NonFire}, \end{cases}$$

where p(I(x, y)) denotes the probability of the entire color channel and $\tau$ denotes a preset value for designating a fire-flame candidate pixel.

6. The method of claim 1, wherein the FFA is defined by a 6-tuple as the following equation e, $$\tilde{F}(Q, \Sigma, \delta, R, Z, \omega),$$

where: Q denotes a finite set of fire-flame states, VH, H, L, and VL, which represent fire-flame states corresponding to probabilities to be a fire-flame, Very High (VH), High (H), Low (L), and Very Low (VL); $\Sigma$ is a finite set of input symbols (events) in the FFA, {a11, ..., a14, a21, ..., a24, a31, ..., a34, a41, ..., a44}, the number of cases for all paths to move among the states, VH, H, L, and VL; $\delta$ is a fuzzy transition function, $\delta$: Q×Σ×Q->(0, 1]; R is a set of initial state, VH; Z is a set of output symbols (labels), Z={accept (Fire), reject (Non-Fire)}; and $\omega$: Q->Z is the output function.

7. The method of claim 6, wherein the determination as to whether the fire-flame candidate region corresponds to a fire-flame comprises:
(5a) calculating membership values of brightness, wavelet energy, and of motion orientations, with respect to fire-flame candidate regions by states of fire-flames, via fuzzy membership functions, respectively;
(5b) designating the average of membership values by the states of fire-flames as a membership value over time;
(5c) expressing the membership values over time, with respect to the fire-flame candidate regions, as the state vectors according to the states of the fire-flame;
(5d) acquiring the state values by multiplying a state transition weight of a fuzzy transition function, expressed by the following equation f, to the state vectors, and determining the largest state value as the final state value; and
(5e) outputting a state whether a fire-flame exists using the state of fire-flame corresponding to the final state value, $$t = (a_{ij})_{n \times n} = \begin{bmatrix} a_{11} & \cdots & a_{1n-1} & 0 \\ \vdots & \vdots & \vdots & \vdots \\ 0 & \cdots & a_{nn-1} & a_{nn} \end{bmatrix},$$ [Equation f]

where $a_{ij}$ denotes a state transition weight when the state of FFA transits from i to j, i denotes a current state, j denotes a next state, and n denotes the finite number.

8. The method of claim 7, wherein:
the membership value of brightness is calculated by transforming the temporal brightness into a probability density function of skewness;
the membership value of wavelet energy is calculated by transforming wavelet energy into a probability density function of skewness via the following equation g; and
the membership value of motion orientation is calculated by transforming the upward orientation ratio of a motion into a probability density function of skewness via the following equation g, $$E_i(x,y) = |LH_i(x,y)| + |HL_i(x,y)| + |HH_i(x,y)|,$$ [Equation g]

where Ei(x, y) is wavelet energy of i-th block, and LH (Low-High), HL (High-Low), and HH (High-High) are coefficients of the horizontal, vertical, and diagonal components, respectively, acquired from a wavelet transformed image, $$Up_i = \frac{\sum_{j=1}^{n} 1(M_j^i)}{N},$$ [Equation h]

where $Up_i$ is the upward orientation ratio of a motion, N denotes frame, $M_f^t$ denotes a motion orientation in a block and is acquired by the following equation i, and 1( ) is a function that returns 1 if $M_f^t$ has a value between 2 and 4, and 0 otherwise, $$M_{code}^b = \left[\frac{\operatorname{atan}(mv_y^b / mv_x^b) \times 10}{8}\right] + 1,$$ [Equation i]

where $M_{code}^b$ denotes the motion orientation in a block, $mv_x^b$ is a motion vector in x-direction, and $mv_y^b$ is a motion vector in y-direction.

9. The method of claim 8, wherein the membership value of the motion orientation is acquired by transforming the probability density functions of VH an VL states via the following equations j and k, $$\mu_{M\text{-}VH}(x) = \begin{cases} e^{-\frac{1}{2}\left(\frac{x-m_{VH}}{\sigma_{VH}}\right)^2} & x < \mu_{VH} \\ 1 & x \geq \mu_{VH}, \end{cases} \quad \text{[Equation j]}$$

$$\mu_{M\text{-}VL}(x) = \begin{cases} e^{-\frac{1}{2}\left(\frac{x-m_{VL}}{\sigma_{VL}}\right)^2} & x > \mu_{VL} \\ 1 & x \leq \mu_{VL}, \end{cases} \quad \text{[Equation k]}$$

where $m_{VH}$, $m_{VL}$, $\delta_{VH}$, and $\delta_{VL}$ are averages and variances of probability density functions in VH and VL states in the motion orientations, respectively, and $\mu_{VH}$, $\mu_{VL}$, and $\mu_{M\text{-}VL}$ are membership functions in VH and VL states and in modified VH and VL states, in the motion orientations, respectively.

10. The method of claim 7, wherein:

the state vectors according to the states of the fire-flame represented by the following equation 1; and the state values are calculated by the following equation m, $$q = [m_k]_{1 \times n} = [m_1 \ldots m_n], \quad \text{[Equation 1]}$$

where q is state vector, n is a state of a fire-flame, and mk is a membership value of the n-th state, $$\tilde{q} = q \circ t = [m_1 \ \ldots \ m_n] \cdot \begin{bmatrix} a_{11} & \ldots & a_{1n-1} & 0 \\ \vdots & \vdots & \vdots & \vdots \\ 0 & \ldots & a_{nn-1} & a_{nn} \end{bmatrix}, \quad \text{[Equation 16]}$$

where t is expressed by the equation f.

* * * * *